United States Patent Office 3,241,294
Patented Mar. 22, 1966

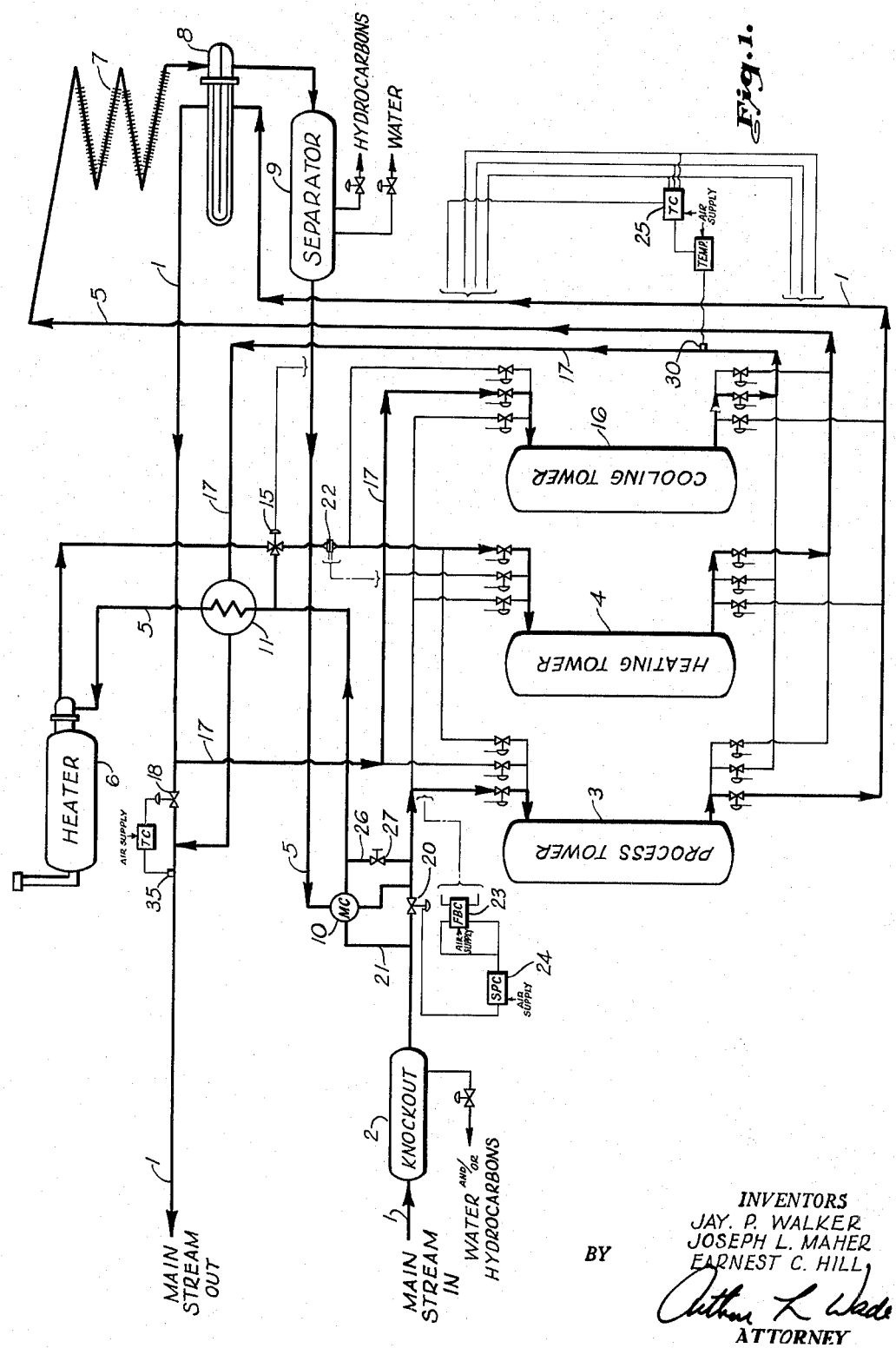

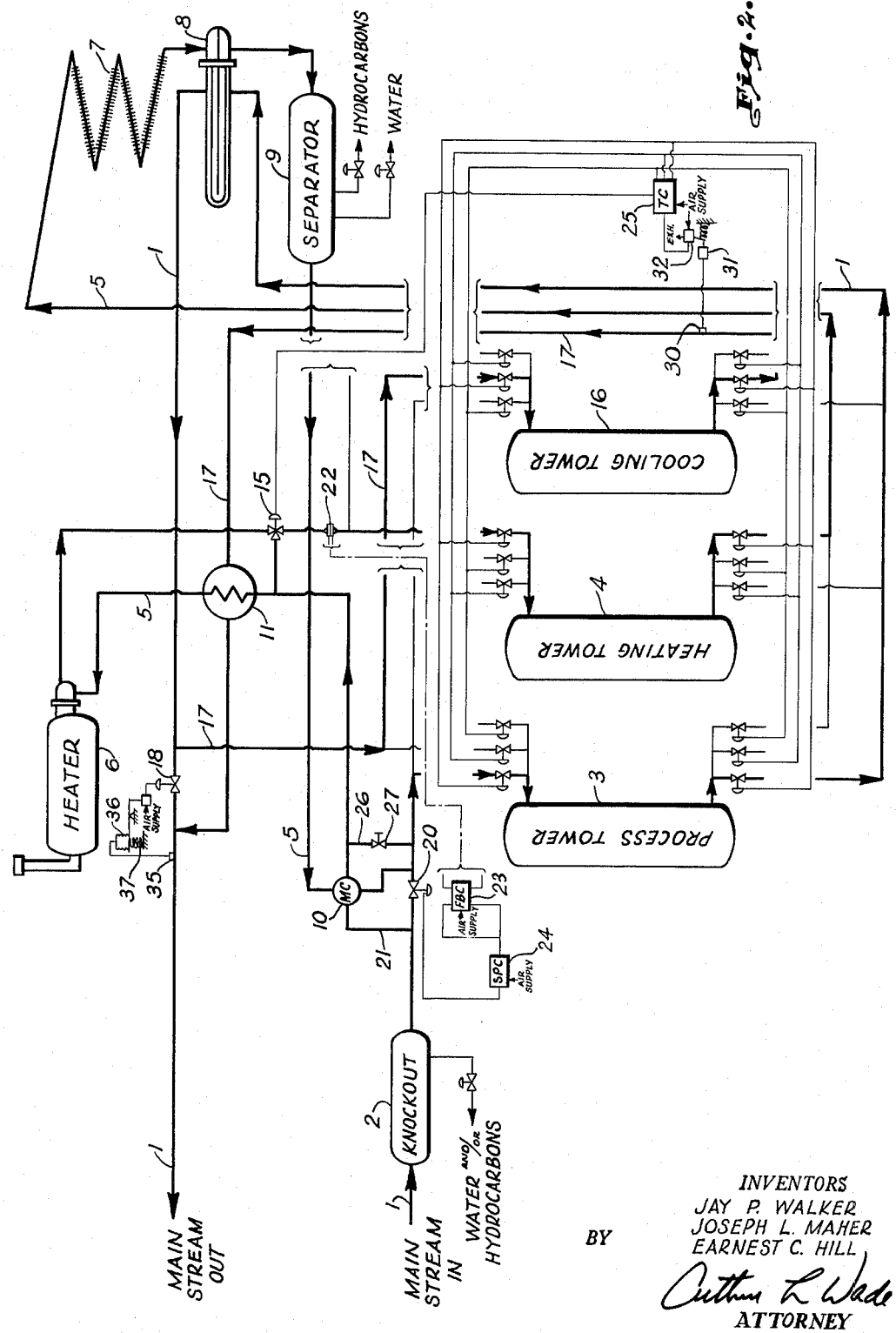

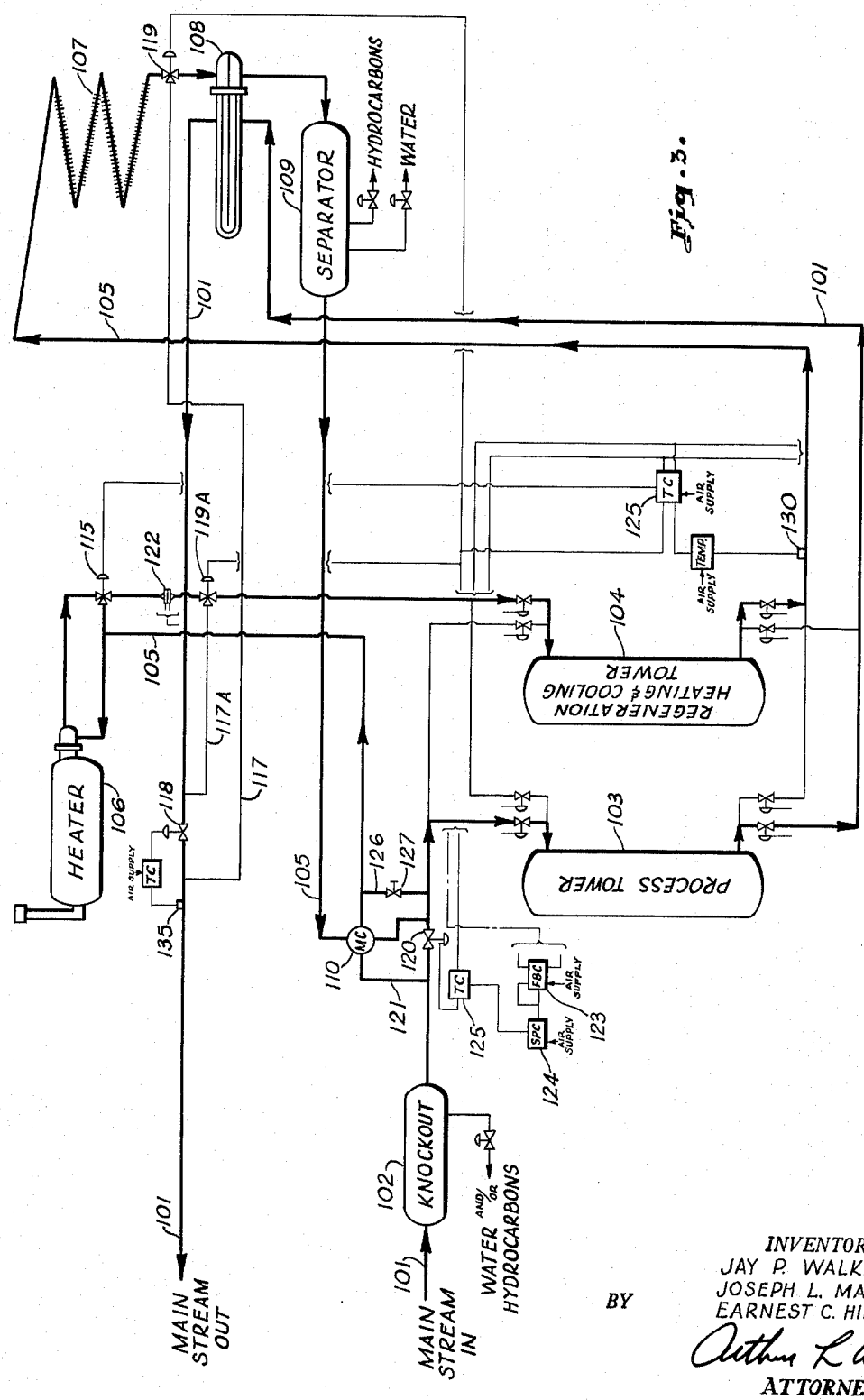

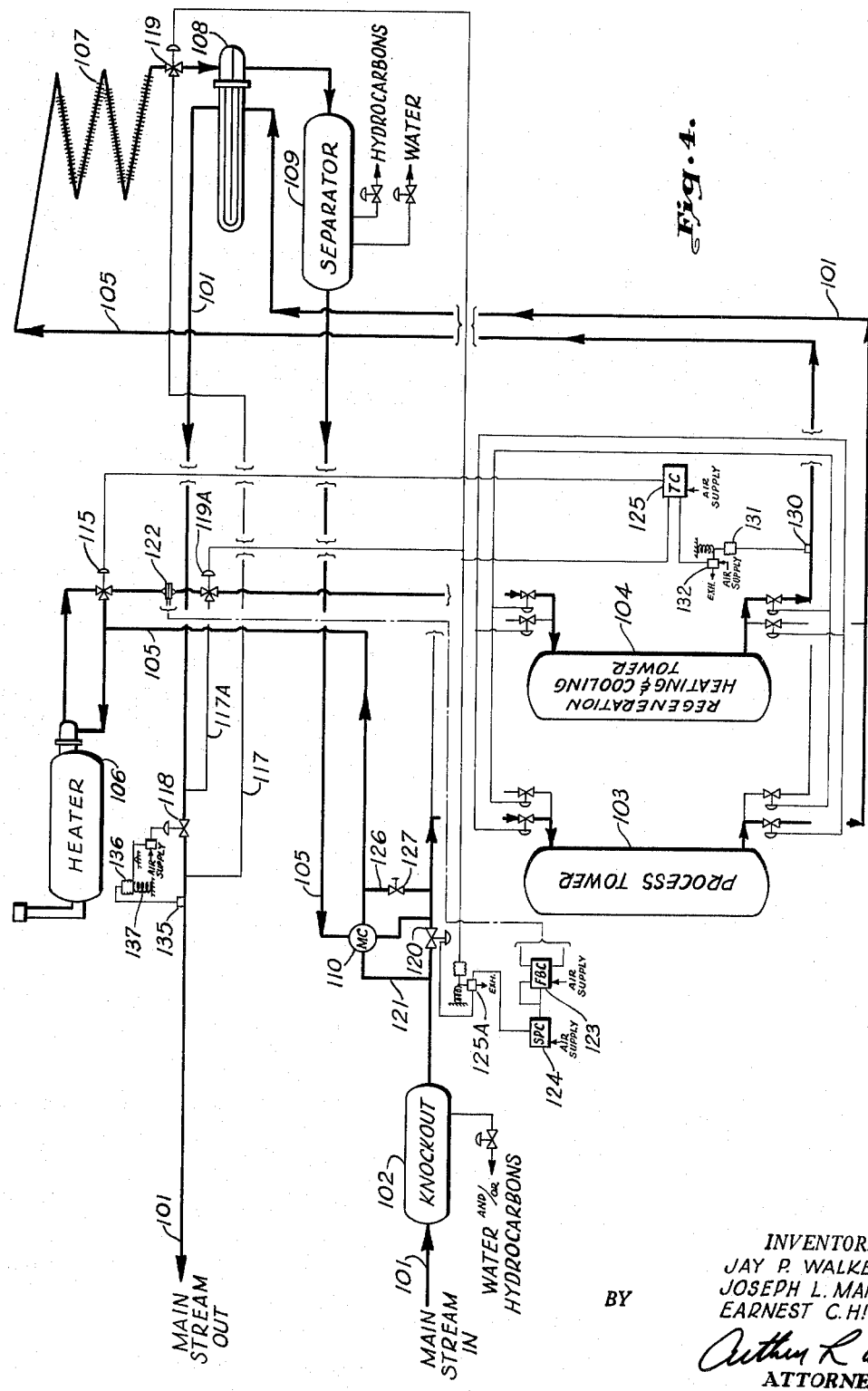

3,241,294
PROCESS AND APPARATUS FOR RECOVERING HYDROCARBONS FROM GAS STREAMS
Jay P. Walker and Joseph L. Maher, Tulsa, Okla., and Earnest C. Hill, Houston, Tex., assignors to National Tank Company, Tulsa, Okla., a corporation of Nevada
Filed Dec. 15, 1959, Ser. No. 859,729
8 Claims. (Cl. 55—20)

This invention relates to regeneration of a bed of dry desiccant used to adsorb selected components from a stream of natural gas. More specifically, the invention relates to utilizing a portion of the processed natural gas for cooling the bed before the bed is returned to adsorbing service.

It is presently common to establish a circuit of gas in a closed circuit and recycle the gas through a bed of adsorbent material to drive off constituents the bed has adsorbed from a main stream of natural gas. The gas in the closed circuit is heated in order to vaporize the constituents from the bed. The heated regenerating gas is then reduced in temperature by some available source of coolant until the selected components are condensed and removed from the regeneration gas stream as liquid.

It is common to turn off, or bypass, the heater for the regeneration gas stream in order that this recycled regeneration gas can be used to reduce the temperature of the bed before it is returned to adsorption service. However, the bed will start to adsorb recoverable components from the regeneration gas stream as the bed cools. The bed, so pre-loaded with sorbate, will have its adsorptive capacity, relative to the main stream to be processed, reduced. Also, the alternative heating and cooling of the regeneration stream requires a large change in inventory to keep the pressure differential it has with the main stream small enough to prevent damage to the bed, or disruption to the process, as the bed is shifted in its contact with the streams. Finally, this double use of the regeneration stream, for both heating and cooling, limits the time of the complete regeneration cycle to that time needed for the completion of both these functions in series.

A principal object of the present invention is to reduce the temperature of a heated bed of adsorbent material to the temperature required for the bed to efficiently process the main gas stream without use of the gas stream which is used to vaporize the condensable components from the bed.

Another object is to use at least a portion of the processed main gas stream to reduce the temperature of the heated bed without raising the temperature of the entire main gas stream processed above a predetermined value.

Another object is to prevent shift to the bed of adsorbent material from being cooled to the service of processing the main gas stream until such time as the temperature has been reduced to a predetermined level.

Another object is to establish the time span for a complete cycle of heating and cooling a bed of adsorbent being regenerated, limited only by the capacities of separate streams of gas to separately heat and cool the bed in the cycle of regeneration.

Another object is to maintain a pressure differential between the main gas stream and the heating and cooling streams for the bed which will permit shift of the bed of adsorbent between the streams without physical disturbance to the bed or disruption to the process.

The present invention contemplates a system which absorbs water and condensable hydrocarbons from a stream of natural gas with a bed of adsorbent material. After the bed has processed the stream of natural gas the bed is first heated by a reactivation flow stream and then cooled by a regulated portion of the processed stream.

The invention further contemplates a regulator responsive to the temperature of the cooling portion of the processed stream as it flows from the bed being cooled, the regulator blocking the time-cycle controller from shifting the bed being cooled back to processing service until the bed temperature is lowered to a predetermined level.

The invention further contemplates the regulated cooling portion of the processed stream being returned to the processed stream. The size of the cooling portion of the processed stream is established by a regulator responsive to the final temperature of the processed stream after the cooling portion has been returned to it.

The invention contemplates natural, or artificial, sources of coolant being used to maintain the gas circuits at temperature and pressure differentials which will not cause mechanical disturbance of the beds as they are shifted between the circuits nor which will materially affect the process.

Other objects, advantages and features of this invention will become apparent to one skilled in the art upon consideration of the written specification, appended claims, and attached drawings wherein;

FIG. 1 is a diagrammaic and schematic representation of a system, having three beds of desiccant, with which the method of the invention is practiced;

FIG. 2 is the system of FIG. 1 with the control features of FIG. 1 illustrated in greater detail;

FIG. 3 is a diagrammatic and schematic representation of a system, having two beds of desiccant, with which the method of the invention is practiced; and FIG. 4 is the system of FIG. 3 with the control features of FIG. 3 shown in greater detail.

GENERAL PLAN OF THE DISCLOSURE

There are two basic difficulties in disclosing the preferred embodiment of the present invention. Although the system in which the invention is embodied is represented both diagrammatically and schematically, for simplicity, the drawings of the conduits interconnecting the various pieces of apparatus form a maze of lines in which the process is difficult to follow without exhaustive study. Secondly, the instrumentation and control apparatus is also complex, even when considered separately from the conduits. Placing both the process conduits and the control piping on the same diagram is very difficult to do with clarity.

To solve the first problem of representation, a first drawing has been made of the process conduits with the locations of the instrumentation and control apparatus indicated with extreme simplicity. To meet the second problem, a second drawing has been made which shows the measuring and control apparatus in greater detail, interconnected to carry out their function. In making the instrumentation and control connections continuous, the conduits of the process have been broken at points which appear desirable to give clarity.

FIGS. 1 and 2, then, are to be considered together in illustrating the process conduits and the instrumentation and control piping for a three-bed system utilizing the present invention. FIGS. 3 and 4 are to be taken together to illustrate a two-bed system.

THREE-BED SYSTEM

The process—Adsorption

FIG. 1 is a flow diagram of a system employing a dry desiccant to process a stream of natural gas. The stream is brought to the process by means of conduit 1. The various pieces of processing apparatus are included in this conduit 1 receiving its stream. After the processing, this main stream of gas is removed through conduit 1. The first piece of apparatus shown as included in conduit 1 is an inlet separator, or knockout, 2. At a particular temperature and particular pressure, a specific stream of natural gas to be processed may have liquids mechanically entrained therein. Knockout 2 is designed to mechanically scrub these mechanically entrained liquids, generally classified as water and/or hydrocarbons, from the stream.

Conduit 1 is next illustrated as having a valve therein with which to produce a regulated pressure drop with which to force part of the main stream through the driving section of a motor-compressor. The entire main stream is next passed through one of the three towers disclosed for contact with the bed of adsorbent material for adsorption of condensable liquids from the stream of natural gas.

A valved manifold directs the gas of the main stream through each of the towers in a predetermined sequence. A similar manifold receives the gas of the main stream from the towers and passes the gas to a heat exchanger before the processed gas is discharged to a point of use. In these tower manifolds for the main stream of gas, the branch going to tower 3, and coming from tower 3, is shown in the heavier line. This heavy-line convention is used to indicate that the tower 3 is the one of the three towers processing the natural gas in the system as represented. Tower 3 is suitably legended to additionally emphasize its function at this stage of the process illustrated.

The process—Bed heating and liquid recovery

It is to be assumed that tower 4 previously processed the main stream, removing therefrom liquefiable hydrocarbons and water. In order to now remove these components from the adsorbent material, it is heated. A convenient means for heating tower 4 is to conduct a heated stream of gas therethrough. The circuit for this heating gas is characterized by conduit 5.

Conduit 5 is illustrated as a closed circuit containing gas which is passed through heater 6 before it is passed through tower 4. A second valved manifold is provided for conducting the heating gas to each of the three towers as desired. Also, a manifold on the discharge of the three towers removes the regeneration gas and directs it through a cooling means. Atmospheric cooler 7 is first illustrated, the regeneration gas being next conducted to heat exchanger 8 to further lower its temperature by heat exchange with the processed stream in conduit 1. Properly designed, the various cooling structures of the system will result in delivery of the regeneration gas to separator 9 at a temperature at which condensation of the desirable hydrocarbons and water will take place.

In separator 9 the recoverable liquid hydrocarbons are removed, separate from the water. This is the end result sought by the process. Of course, there are other advantages which are not to be overlooked. As an example, reduction in dew point of the main stream of natural gas by this process will avoid subsequent formation of liquids in transporting pipe lines which will raise compressor costs. The gaseous portion of the regeneration stream, discharged from separator 9, is returned to heater 6 through motor-compressor 10 and heat exchanger 11. Motor-compressor 10 is disclosed as a mechanical link between the regeneration stream and the main stream through which the energy of the main stream is applied to circulate the gas in the closed circuit. After each tower has been heated, with this regeneration stream, and its liquifiable components vaporized from its bed, the tower and its bed is cooled to raise its adsorptive capacity so that it may be returned to effective process service.

Heat exchanger 11 is a means whereby heat extracted from the tower bed to raise its adsorptive capacity may be conserved. The cooling circuit provided by the present invention is associated, through this exchanger 11, with the gas of conduit 5 as the regeneration stream is recycled to the heater. The heat load of heater 6 is thereby reduced.

The process—Cooling the bed

It has been conventional to use the regeneration stream to cool the bed heated in regeneration. Under this conventional system, heater 6 would simply be bypassed with three-way valve 15. It may still be advisable to initiate the cooling of the bed in tower 4 by this technique. Until the tower 4 is cooled to a certain level, the relatively cool discharge from separator 9 can be used for this cooling process without appreciable adsorption from this stream, comparatively rich with recoverable components.

Before the bed in tower 4 cools enough to begin preloading with liquefiable hydrocarbons from the bypassing conduit 5, the bed is switched into conduit 17. Conduit 17 characterizes the cooling circuit established for the tower beds.

As with conduits 1 and 5, conduit 17 is supplied with valved manifolds for selection of the tower through which its cooling gas stream is directed. A portion of the processed natural gas stream in conduit 1 is split-off, into conduit 17, for the cooling of the tower heated, and perhaps partially cooled, by the recycled regeneration gas in conduit 5. Conduit 17 is illustrated as coming directly from conduit 1, going to the bed in tower 16 and going back to conduit 1.

Between the two points of connection between conduit 17 and conduit 1, a valve 18 is mounted in conduit 1 with which a differential of pressure is established. Regulation of this valve 18 determines the size of the portion of tail gas in conduit 1 which is shunted through conduit 17 to complete the cooling of tower 16. After cooling tower 16, the stream of conduit 17 is heat exchanged with the stream of conduit 17 in exchanger 11 to scavenge its heat and keep the final temperature of the main stream within limits.

SUMMARY OF PROCESS

The over-all operation of the process illustrated in FIGS. 1 and 2 is quite clear if it initially appreciated that three separate circuits are established for each of the beds in the three towers. The first circuit in conduit 1, brings the main stream of natural gas into contact with the bed of tower 3 for adsorbing liquefiable components from the stream. The second circuit, in conduit 5, initially provides a heated medium for elevating the temperature of the bed until the liquefiable components are vaporized and removed by the heated medium. The second circuit is then bypassed around its heater to start cooling the bed. The third circuit, in conduit 17, provides a relatively lean and cool stream for reducing the temperature of the heated bed until its adsorptive capacity is raised sufficiently high for adsorption service on the main stream.

The control system—Generally

FIG. 2 illustrates the various segments of the control system for the process of FIG. 1. One segment controls the energy transfer from the main stream to the heating stream in the closed circuit. Another segment controls the valving of the three intake and discharge manifolds and heater bypass valve in order that each bed will process, heat and cool in a desired sequence and for a desired length of time. Another segment monitors the temperature of the cooled bed to prevent the continuation of automatic cycling of the manifold valves which will return the cooled bed to process service until the cooled bed is reduced to the proper temperature for adsorption. Finally, a control segment is provided for a portion of the tail, or processed, gas to be split-off for cooling to keep the temperature of the processed natural gas stream discharged from the system below a predetermined maximum.

The control system—Regeneration circuit

The control of the process of FIG. 1 begins with an understanding of the regulation of the power transfer from the main flow stream to the closed, or recycled, regeneration stream. As previously indicated, differential control valve 20 is placed in conduit 1 and a bypass conduit 21 around valve 20 is connected to the motor section of motor-compressor 10. Regulation of valve 20 then establishes the differential in conduit 1 which controls the amount of main stream gas shunted through conduit 21 and, therefore, the speed of motor-compressor 10.

Differential valve 20 is regulated by the flow in the closed circuit. The flow in conduit 5 of the closed circuit is detected by restriction 22 which may be in the form of an orifice plate which creates a differential of pressure across itself. The differential across orifice 22 is applied to a force balance control relay 23. Control relay 23 establishes an output which is applied to a set point controller 24. The output of set point controller 24 is indicated in the form of a fluid pressure which is applied to the diaphragm of valve 20. This general control of differential valve 20 from orifice 22, as a primary element, is disclosed in Fontaine et al., S.N. 740,144, filed June 5, 1958. A more specific disclosure of this control system, incorporating units equivalent to controller 23 and 24, is in Baker, S.N. 781,760, filed December 19, 1958.

Orifice 22 is exposed to the variation in the flowing temperature of the recycled regeneration stream in conduit 5. The resulting variation in the differential pressure across orifice 22 results in regulation of valve 20 in the correct direction to vary the flow rate to conduit 21. A decrease of the flowing temperature in conduit 5 causes an increase of flow rate in conduit 21. Increase of the flowing temperature in conduit 5 causes a decrease of flow rate in conduit 21. Thus there is an automatic regulation of valve 20 in the correct direction to maintain the flow rate required by set point controller 24.

The supply of gas for the regeneration circuit may be from a source whose pressure difference with the main stream is low enough to avoid mechanical disturbance of the beds of the towers as the towers are switched between the circuits.

It is convenient to utilize the main stream of gas to be processed as the source. A communicating pipe 26 is shown between conduit 1 downstream of valve 20 and conduit 5 downstream of motor-compressor 10. It may be desirable to establish a maximum flow rate through pipe 26. A valve 27 in pipe 26 represents a means of establishing this control. Obviously, the pipe 26 could be connected between other points in conduit 1 and 5 to equalize the pressure between the two circuits.

*The control system—Manifold valves and heater bypass*

Manifolds for conduits 1, 5 and 17 have been provided so that each conduit may be connected to each of the three towers 3, 4 and 16. Basically, the three conduits are connected to the three towers, through these manifolds, on a time cycle basis. A time cycle controller 25 has been illustrated as connected separately to each of the three intake manifold valves and to each of the three discharge manifold valves of the conduits and the heating-cooling valve 15. A time-cycle mechanism suitable for this purpose is also illustrated in Baker, S.N. 781,760, filed December 19, 1958. Through this time-cycle controller the intake manifold of each conduit is valved at the same time the output manifold for the same conduit is valved.

Time-cycle controller 25 could be either an electric or the mechanical-pneumatic type illustrated in Baker, S.N. 781,760, filed December 19, 1958. If the mechanical-pneumatic type, its cams can be readily shaped so as to actuate valve 15 before the three manifolds are valved to switch the towers. In this manner the cooling of the bed of tower 4 is started with the closed regeneration circuit of conduit 5 bypassing heater 6. The cooling is then completed with the gas of conduit 17. Each of the three manifolds are valved simultaneously, by controller 25, to effectively pass the towers from the left to the right in the system as illustrated in FIGS. 1 and 2.

*The control system—Cooling tower temperature monitor*

The cooling of the bed in tower 16 must be carefully monitored to prevent the tower from being placed back into adsorption service before its adsorptive capacity is raised to an effective level. The cooling function is guarded by placing temperature responsive element 30 in the output manifold of conduit 17.

A simple, filled, system is connected to element 17, including expansible bellows 31. A three-way, snap-acting fluid pressure valve 32 is actuated by bellows 30 to develop a fluid pressure output. This output is applied to controller 25 to block its output actuating impulses to the manifold valves until the temperature of the bed in tower 16 is low enough to insure the adsorptive capacity of the bed is high enough to give proper processing service to the main stream.

*The control system—Cooling circuit*

Time-cycle controller 25 may be readily arranged to initiate the cooling of a bed, in the position of tower 4, a finite period of time before effectively placing the bed in the position of tower 16. Bypass valve 15 is positioned so the gas in conduit 5 does not pass through either exchanger 11 or heater 6, but is diverted around these units. In this way, the gas from the separator 9 is used to start cooling the bed in tower 4 until the bed reaches a temperature near which it will begin to pre-load with recoverable hydrocarbons and water from the separator gas. Gas of cooling circuit 17 is then substituted for the separator gas.

The main gas stream in conduit 1 is heated by the regeneration gas of conduit 17 as the gas returns from cooling tower 16. There are several reasons why the final temperature of this main stream should be kept below a predetermined value. To monitor this final temperature, responsive element 35 is placed in conduit 1, downstream of both valve 18 and the connections of conduit 17 with conduit 1.

FIG. 2 illustrates how temperature responsive element 35 is readily made a part of a filled system including bellows 36. Bellows 36 is arranged to oppose spring 37 in a position-balance system whose fluid pressure output controls valve 18. A force-balance/set point controller combination similar to 23 and 24 may, of course be employed for control of the valve 18. Whichever system of control is employed, valve 18 is to be controlled from the temperature at 35 to regulate the portion of the processed gas diverted into conduit 17, from conduit 1. In general, the cooler the processed gas, the more valve 18 will be regulated toward its closed position by the position-balance controller. If the final temperature of the gas in conduit 1, as detected by temperature element 35, rises too high for the specifications set by the many considerations of the delivery point, valve 18 will be opened to permit the gas to come directly from exchanger 8. Therefore, less heat will come from tower 16 and the temperature of the gas leaving the process through conduit 1 will be kept within predetermined limits.

As the gas of conduit 17 leaves tower 16, it may be heat exchanged with conduit 5, by exchanger 11. Some of the heat of tower 16 will, thereby, be scavenged back into the system to relieve the heat load of heater 6 and return a cooler gas to the main stream whose temperature is monitored.

TWO-BED SYSTEM

*The process—Adsorption*

In many respects, the system of FIGS. 3 and 4 operates exactly as does the three-bed system of FIGS. 1 and 2. However, there are differences which may make it confusing to use the same numbers to identify similar conduits and apparatus. Therefore, another series of numbers is employed in FIGS. 3 and 4.

The stream of natural gas to be processed is in conduit

101. Inlet separator 102 receives the stream and scrubs free liquids from it.

Valved manifolds direct the gas of conduit 101 through each of the two towers in turn. As in FIGS. 1 and 2, a heavy-line drawing is used to show the flow as the system is operating at one period. As illustrated, at this time, the main stream is being processed by tower 103.

*The process—Bed heating and liquid recovery*

Tower 104 is assumed to have previously processed the main stream. Having adsorbed liquefiable hydrocarbons and water from the main stream, tower 104 is next heated by a stream of gas in conduit 105.

Conduit 105 is a closed circuit, heated by heater 106. Manifolds are supplied conduit 105 so each tower may be heated in turn by proper, alternate, manipulation of the manifold valves.

The gas from the heated tower, in conduit 105, is cooled by atmospheric cooler 107 and heat exchanger 108 until condensation takes place. The condensed liquids are removed in separator 109 as the basic recovery function of the system. The gas not condensed in separator 109 is then returned to heater 106 through motor-compressor 110.

*The process—Cooling the bed*

It has been conventional to simply bypass heater 106 with the regeneration stream of gas to cool the heated bed. Three-way valve 115 is employed to direct the regeneration gas so as to cool the bed in this manner. However, it is not advisable to cool the bed below a certain temperature or pre-loading will occur. Therefore, the processed, leaner main stream can be used as it was used in the three-tower system.

A completely separate cooling circuit for the main stream gas is not necessary in the system of FIGS. 3 and 4. With a system using but two towers, the heating function and cooling function of the gas in the conduit 105 must be suspended for a portion of each cycle. The lean, relatively cool, tail gas is then spliced into the conduit 105 manifolds on each side of the tower being cooled in regeneration.

The cooling circuit then becomes embodied in conduits 117 and 117A. These conduits are connected into conduit 101 on each side of valve 118. Three-way valves 119 and 119A specifically connect these conduits downstream of heater 106 and downstream of heat exchanger 107. When the valves are positioned as intended, the outputs of motor-compressor 110 and separator 109 are dead-ended at the valves and the tail gas is sent through tower 104.

*The control system—Generally*

FIG. 4 illustrates the various control elements of the process of FIG. 3. The energy transfer from the main stream to the closed, recycled regeneration stream is controlled exactly as in FIG. 2. The regeneration stream is dead-ended at valves 119 and 119A during each cycle in order that the cooling by the tail gas can complete the bed cooling. At such time, the motor-compressor is completely bypassed by the main stream and thereby stopped completely.

The normal, alternate positioning of the manifold valves of conduits 101 and 105 is carried out on a time-cycle basis. The conduit 105 will be bypassed around heater 106 to start the cooling of the bed and then the tail gas is caused to take over and complete this function.

As in the system of FIG. 2, the temperature of the cooled bed is monitored. The cycle will not continue until the regenerated bed is cool enough to do an effective job of processing the main stream.

Finally, the tail-gas available for cooling is controlled by the temperature of the processed gas as it is discharged from the system. The amount of gas available for this cooling is set by this temperature.

*The control system—Regeneration circuit*

The control of power transfer from the flowing stream of conduit 101 is specifically accomplished by regulation of valve 120. Valve 120 is placed in bypass conduit 121 which includes the driven section of motor-compressor 110.

Valve 120 is controlled by the differential across orifice 122. More specifically, force balance control relay 123 establishes an output which is applied to set point controller 124. It is the output of set point controller 124 which is normally applied to position valve 120.

When valves 119 and 119A are positioned to pass the processed gas through the cooling tower 104, the output of controller 124 is blocked from valve 120. Specifically, the control pipe from controller 124 to valve 120 is vented to atmosphere through three-way valve 125A to allow valve 120 to open and no longer force a part of the stream in conduit 101 through 121. As indicated in FIG. 4, it is anticipated that the impulse to valves 119 and 119A will be simultaneously applied to gas valve 125A.

Regeneration gas for conduit 105 is supplied from conduit 101. Communicating pipe 126 is shown between conduit 101 and conduit 105 with a valve 127 to control the shift in gas inventory between the two conduits as bypass heater valve 115 is opened and closed.

*The control system—Manifold valves and heater bypass*

The manifold valves for conduits 101 and 105 are alternately operated by time cycle controller 125. Each set of valves is separately actuated. Heating-cooling valve 115 is also separately actuated, so that heater 106 can be bypassed a predetermined period of time during each half-cycle of operation to initiate the cooling of tower 104 before the tail gas is spliced into the regeneration circuit and thereby substituted for the bypassing regeneration gas.

*The control system—Cooling tower temperature monitor*

The temperature of the cooling tower is sensed by temprature responsive element 130. Element 130 is part of a filled system including bellows 131. As in the system of FIGS. 1 and 2, bellows 131 is opposed by a spring which mechanically actuates three-way valve 132. Valve 132 develops an impulse which is applied to time-cycle controller 125 to block its outputs to the manifold valves until the temperature at 130 is low enough to indicate the adsorptive capacity of the bed in tower 104 is high enough to again process the main stream.

*The control system—Cooling circuit*

Time-cycle controller 125 has been disclosed as actuating valve 115 a predetermined time before effectively placing the bed of tower 104 in the position of tower 103. Heater 106 is bypassed and the relatively cool gas from separator 109 initiates the cooling of the bed in tower 104. This period of cooling is allowed to continue until the bed is almost cool enough to pre-load with recoverable liquids from the separator gas. The cooling circuit of conduits 117 and 117A is then spliced into the conduit 105 through tower 104 by actuation of valves 119 and 119A with controller 125.

The main stream, downstream of its connection with conduit 117, must be kept below a temperature determined by conditions downstream of the process. Temperature element 135 responds to the downstream temperatures. Element 135, as part of a filled system including bellows 136, opposes the force of spring 37 in a position-balance system to establish a fluid pressure. The fluid pressure actuates valve 118 so tail gas will be forced through conduits 117 and 117A. The tail gas volume forced into the cooling circuit will be limited by the temperature at 135, and depend on the amount of precooling by the regeneration circuit and the effectiveness of air cooler 107.

Obviously it is not feasible to scavenge the heat picked up by this circuit as was done with heat exchanger 11 in FIGS. 1 and 2. The regeneration circuit of conduit 105 and the cooling circuit of conduits 117 and 117A are not active at the same time. Therefore, a simple heat exchanger to couple conduits 105 and 117 would not function to transfer heat between the two conduits.

CONCLUSION

In one aspect, the invention serves to reduce the temperature of a regenerated bed of adsorbent material with the supply of gas of the process most readily available and offering the smallest opportunity for pre-loading the bed with the very materials it is to remove from the processed gas. The processed gas itself is the choice.

The problems of conducting the tail gas to the bed to be cooled differ to some extent between two and three tower systems. These differences have been carefully pointed out.

The more specific problems of controlling the conducting of the tail gas have been disclosed. The basic time-cycle control of the bed switching, modified, monitored and supplemented by final bed temperature and final temperature of the processed gas has been carefully set forth. The automatic continuous operation of a hydrocarbon recovery unit is obviously possible in accordance with this disclosure.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. The method of removing water and recovering condensable hydrocarbons from a main flow stream of natural gas which includes:
   contacting a bed of adsorbent material with the main flow stream of natural gas, whereby water and condensable hydrocarbons are adsorbed by the bed material;
   heating a reactivation flow stream of natural gas, whereby the vaporizing capacity of the reactivating flow stream is raised;
   contacting the bed of adsorbent material with the heated reactivation flow stream;
   cooling the reactivation flow stream to its dew point, whereby water vaporized from the bed is removed and condensable hydrocarbons are recovered;
   interrupting the heating of the reactivation flow stream after the bed has had its adsorbed water and condensable hydrocarbons vaporized by the reactivation flow stream, whereby the cooling of the bed is initiated in preparing the bed to be again contacted with the main flow stream of natural gas to remove water and condensable hydrocarbons therefrom;
   diverting at least a portion of the main flow stream after the stream has water and hydrocarbons adsorbed from it;
   cooling the bed with the diverted portion of the main flow stream, whereby the bed is prepared to be again contacted with the main flow stream of natural gas to remove water and hydrocarbons from the main flow stream by adsorption;
   returning the diverted portion of the main flow stream to the undiverted remainder of the main flow stream;
   sensing the temperature of the main flow stream after the diverted portion has cooled the bed and returned to the main flow stream;
   and utilizing the temperature of the mixture of the main flow stream and diverted portion to control the size of the diverted portion of the main flow stream cooling the bed.

2. A system for removing water and recovering condensable hydrocarbons from a main flow stream of natural gas which includes;
   a bed of adsorbent material;
   a first circuit for the main flow stream of natural gas including the bed of adsorbent material; whereby the natural gas passing through the bed has its water and condensable hydrocarbons retained by the bed;
   a second circuit for a reactivation flow stream of gas;
   a heater for the reactivation flow stream;
   means for including the bed of adsorbent material in the second circuit after the bed has removed water and condensable hydrocarbons from the main flow stream;
   means for cooling the reactivation flow stream after it has flowed in the second circuit from the bed until the dew point of the stream is reached and recovery of the condensable hydrocarbons is made;
   means with which to interrupt the heat input from the heater to the reactivation flow stream after water and condensable hydrocarbons have been vaporized from the bed, whereby the reactivation flow stream then becomes a cooling medium for the bed for a finite period of time in preparing the bed to be again contacted by the main flow stream of natural gas to remove water and condensable hydrocarbons therefrom;
   a third circuit for diverting at least a portion of the main flow stream after the stream has water and hydrocarbons adsorbed from it;
   means for including the bed of adsorbent material in the third circuit to cool the bed, whereby the bed is prepared to be again contacted with the main flow stream of the first circuit to remove water and hydrocarbons from the stream by adsorption;
   means for returning the diverted portion of the main flow stream of the third circuit to the main flow stream of the first circuit;
   temperature responsive means positioned in the main flow stream of the first circuit downstream of the point at which the diverted portion is returned to the undiverted remainder of the main flow stream in order to respond to the temperature of the mixture of the streams;
   and control means regulated by the temperature responsive means to adjust the amount of the main flow stream of gas diverted into the third circuit.

3. A method of removing water and recovering condensable hydrocarbons from a main flow stream of natural gas which includes;
   contacting a bed of adsorbent material with the main flow stream of natural gas, whereby water and condensable hydrocarbons are adsorbed by the bed material;
   heating a reactivation flow stream of natural gas, whereby the vaporizing capacity of the reactivating flow stream is raised;
   contacting the bed of adsorbent material with the heated reactivation flow stream;
   cooling the reactivation flow stream to its dew point, whereby water vaporized from the bed is removed and condensable hydrocarbons are recovered;
   diverting at least a portion of the main flow stream after the stream has water and hydrocarbons adsorbed from it;
   cooling the bed with the diverted portion of the main flow stream, whereby the bed is prepared to be again contacted with the main flow stream of natural gas to remove water and hydrocarbons from the main flow stream by adsorption;

switching the bed between contact by the main flow stream and contact by the regeneration flow stream and contact by the diverted portion of the main flow stream on a predetermined time-cycle program;

sensing the temperature of the diverted portion of the main flow stream after the diverted portion has contacted the bed;

utilizing the sensed temperature of the diverted portion of the main flow stream to adjust the time-cycle program to maintain the sensed temperature of the portion flowing out of the cooled bed within a predetermined range;

returning the diverted portion of the main flow stream to the undiverted remainder of the main flow stream;

sensing the temperature of the main flow stream after the diverted portion has cooled the bed and returned to the main flow stream;

and utilizing the temperature of the mixture of the main flow stream and diverted portion to control the size of the diverted portion of the main flow stream cooling the bed.

4. A system for removing water and recovering condensable hydrocarbons from a main flow stream of natural gas which includes;

a bed of adsorbent material;

a first circuit for the main flow stream of natural gas including the bed of adsorbent material, whereby the natural gas passing through the bed has its water and condensable hydrocarbons retained by the bed;

a second circuit for a reactivation flow stream of gas;

a heater for the reactivation flow stream;

means for including the bed of adsorbent material in the second circuit after the bed has removed water and condensable hydrocarbons from the main flow stream;

means for cooling the reactivation flow stream after it has flowed in the second circuit from the bed until the dew point of the stream is reached and recovery of the condensable hydrocarbons is made;

a third circuit for diverting at least a portion of the main flow stream after the stream has water and hydrocarbons adsorbed from it;

means for including the bed of adsorbent material in the third circuit to cool the bed, whereby the bed is prepared to be again contacted with the main flow stream of the first circuit to remove water and hydrocarbons from the stream by adsorption;

a time-cycle controller operating valves between the bed and the three circuits to sequentially include the bed in the circuits;

a temperature responsive means sensing the temperature of the diverted portion of the main flow stream in the third circuit after the diverted portion of the main flow stream has cooled the bed;

means for monitoring the time-cycle controller with the temperature responsive means to initiate the operation of the time-cycle controller in starting the time-cycle program of including the bed in the three circuits when the temperature of the portion flowing out of the cooled bed reaches a predetermined range;

means for returning the diverted portion of the main flow stream of the third circuit to the main flow stream of the first circuit;

temperature responsive means positioned in the main flow stream of the first circuit downstream of the point at which the diverted portion is returned to the undiverted remainder of the main flow stream in order to respond to the temperature of the mixture of the streams;

and control means regulated by the temperature responsive means to adjust the amount of the main flow stream of gas diverted into the third circuit.

5. The method of removing water and recovering condensable hydrocarbons from a main flow stream of natural gas which includes;

contacting a first bed of adsorbed material with the main flow stream of natural gas, whereby water and condensable hydrocarbons are adsorbed by the bed material;

heating a reactivation flow stream of natural gas, whereby the vaporizing capacity of the reactivating flow stream is raised;

contacting the first bed of adsorbent material with the heated reactivation flow stream while diverting the main flow stream to a second bed of adsorbent material;

cooling the reactivation flow stream to its dew point, whereby water and condensable hydrocarbons vaporized from the beds are removed and recovered;

interrupting the heating of the recycled reactivation flow stream after the first bed has had its adsorbed water and condensable hydrocarbons vaporized by the reactivation flow stream, whereby the cooling of the first bed is initiated in preparing the first bed to be again contacted with the main flow stream of natural gas to remove water and condensable hydrocarbons therefrom;

diverting at least a portion of the main flow stream after the stream has water and hydrocarbons adsorbed from it by the second bed of adsorbent material;

terminating the flow of the heated reactivation stream through the first bed of adsorbent material;

continuing the cooling of the first bed of adsorbent material with the diverted portion of the main flow stream, whereby the bed is prepared to be again contacted with the main flow stream of natural gas to remove water and hydrocarbons from the main flow stream by adsorption;

returning the diverted portion of the main flow stream to the undiverted remainder of the main flow stream;

sensing the temperature of the main flow stream after the diverted portion has cooled the first bed and returned to the main flow stream;

utilizing the temperature of the mixture of the main flow stream and diverted portion to regulate a differential pressure in the main flow stream to control the size of the diverted portion of the main flow stream which cools the first bed;

and returning the first bed to processing the main flow stream while the second bed is heated and cooled to regenerate it.

6. A system for removing water and recovering condensable hydrocarbons from a main flow stream of natural gas which includes;

a first bed of adsorbent material;

a first circuit for the main flow stream of natural gas connected to the first bed of adsorbent material, whereby the natural gas passing through the bed has its water and condensable hydrocarbons retained by the bed;

a second circuit for a reactivation flow stream of gas;

a heater for the reactivation flow stream;

a second bed of adsorbent material;

means for disconnecting the first circuit from the first bed and connecting the second circuit to the first bed while the first circuit is connected to the second bed, whereby the heated reactivation flow stream vaporizes the water and condensable hydrocarbons from the first bed while the main flow stream is processed by the second bed;

means for cooling the reactivation flow stream in the second circuit after the heated stream has flowed through the first bed down to the dew point of the stream, whereby water and condensable hydrocarbons vaporized from the beds are removed and recovered;

means with which to interrupt the heat input from the heater to the reactivation flow stream after water and condensable hydrocarbons have been vaporized from the bed, whereby the reactivation flow stream then becomes a cooling medium for the first bed for a finite period of time in preparing the first bed to be again contacted by the main flow stream of natural gas to remove water and condensable hydrocarbons therefrom;

a third circuit connected to the first circuit across a modulating valve in the first circuit which valve is located in the first circuit downstream of the connection of the first circuit with the beds;

means for disconnecting the second circuit from the first bed and connecting the third circuit with the first bed, whereby the first bed has its cooling completed for connection to the first circuit to remove water and hydrocarbons from the main flow stream by adsorption;

temperature responsive means in the first circuit downstream of the connection across the modulating value in the first circuit;

a temperature controller adjusted by the temperature responsive means to develop a control signal for the modulating valve, whereby the amount of the stream in the first circuit diverted into the third circuit by the differential pressure across the modulating valve is regulated by the temperature of the mixture of the main flow stream and diverted portion which cools the first bed;

and means for disconnecting the third circuit from the first bed and reconnecting the first circuit to the first bed while the second bed is disconnected from the first circuit and connected to the second and third circuits.

7. The method of removing water and recovering condensable hydrocarbons from a main flow stream of natural gas which includes;

contacting a first bed and a second bed of adsorbent material with the main flow stream of natural gas on a predetermined time-cycle basis, whereby water and condensable hydrocarbons are adsorbed by the material of the beds;

heating a recycled reactivation flow stream of natural gas, whereby the vaporizing capacity of the reactivating flow stream is raised;

contacting the first bed of adsorbent material with the heated reactivation flow stream while diverting the main flow stream to a second bed of adsorbent material on a predetermined time-cycle basis;

cooling the reactivation flow stream to its dew point, whereby water and condensable hydrocarbons vaporized from the beds are removed and recovered;

diverting at least a portion of the main flow stream after the stream has water and hydrocarbons adsorbed from it by the second bed of adsorbent material;

terminating the flow of the reactivation flow stream through the first bed of adsorbent material on a predetermined time-cycle basis;

cooling the first bed of adsorbent material with the diverted portion of the main flow stream, whereby the bed is prepared to be again contacted with the main flow stream of natural gas to remove water and hydrocarbons from the main flow stream by adsorption;

returning the diverted portion of the main flow stream to the undiverted remainder of the main flow stream;

sensing the temperature of the diverted portion of the main flow stream after the diverted portion has contacted the first bed;

utilizing the sensed temperature of the diverted portion of the main flow stream to adjust the time-cycle programs to maintain the sensed temperature of the portion flowing out of the cooled bed within a predetermined range;

sensing the temperature of the main flow stream after the diverted portion has cooled the first bed and returned to the main flow stream;

utilizing the temperature of the mixture of the main flow stream and diverted portion to regulate a differential pressure in the main flow stream to control the size of the diverted portion of the main flow stream which cools the first bed;

and returning the first bed to processing the main flow stream while the second bed is heated and cooled to regenerate it.

8. A system for removing water and recovering condensable hydrocarbons from a main flow stream of natural gas which includes;

a first bed of adsorbent material;

a first circuit for the main flow stream of natural gas connected to the first bed of adsorbent material, whereby the natural gas passing through the bed has its water and condensable hydrocarbons retained by the bed;

a second circuit for a reactivation flow stream of gas;

a heater for the reactivation flow stream;

a second bed of adsorbent material;

a first set of valves for disconnecting the first circuit from the first bed and connecting the second circuit to the first bed while the first circuit is connected to the second bed, whereby the heated reactivation flow stream vaporizes the water and condensable hydrocarbons from the first bed while the main flow stream is processed by the second bed;

means for cooling the reactivation flow stream in the second circuit after the heated stream has flowed through the first bed down to the dew point of the stream, whereby water and condensable hydrocarbons vaporized from the beds are removed and recovered;

a third circuit connected to the first circuit across a modulating valve in the first circuit which valve is located in the first circuit downstream of the connection of the first circuit with the beds;

a second set of valves for disconnecting the second circuit from the first bed and connecting the third circuit with the first bed, whereby the first bed is cooled and thereby prepared for connection to the first circuit to remove water and hydrocarbons from the main flow stream by adsorption;

a third set of valves for disconnecting the third circuit from the first bed and reconnecting the first circuit to the first bed while the second bed is disconnected from the first circuit and connected to the second and third circuits;

a first temperature responsive means sensing the temperature of the diverted portion of the main flow stream after the diverted portion has contacted the first bed;

a time-cycle controller operating the first and second and third sets of valves between the beds and the three circuits to sequentially connect and disconnect the beds to the three circuits while monitored by the first temperature responsive means to initiate the operation of the time-cycle controller in operating the valves to connect the first circuit with the bed cooled by the third circuit gas when the temperature of the gas portion out of the cooled bed reaches a predetermined range;

a second temperature responsive means in the first circuit downstream of the connection across the modulating valve in the first circuit; and a temperature controller adjusted by the second temperature responsive means to develop a control signal for the modulating valve, whereby the amount of the stream in the first circuit diverted into the third circuit by the differential pressure across the modulating valve is regulated by the temperature of the mixture of the main flow stream and diverted portion which cools the first bed.

References Cited by the Examiner

UNITED STATES PATENTS

| | | | |
|---|---|---|---|
| 1,402,340 | 1/1922 | Burrell et al. | |
| 2,665,769 | 1/1954 | Walker et al. | |
| 2,799,362 | 7/1957 | Miller. | |
| 2,880,818 | 4/1959 | Dow | 55—62 |
| 2,919,764 | 1/1960 | Dillman et al. | |
| 2,957,544 | 10/1960 | Baker. | |
| 3,124,438 | 3/1964 | Lavery | 55—62 X |
| 3,186,144 | 6/1965 | Dow | 55—20 |

REUBEN FRIEDMAN, *Primary Examiner.*

HERBERT L. MARTIN, WALTER BERLOWITZ, WESLEY S. COLE, *Examiners.*